United States Patent
Rödel

(10) Patent No.: US 9,845,063 B2
(45) Date of Patent: Dec. 19, 2017

(54) MOTOR VEHICLE HAVING TWO VEHICLE ELECTRICAL SYSTEMS WITH DIFFERENT VEHICLE-ELECTRICAL-SYSTEM VOLTAGES

(71) Applicant: AUDI AG, Ingolstadt (DE)

(72) Inventor: Reinhold Rödel, Abensberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/898,087

(22) PCT Filed: May 21, 2014

(86) PCT No.: PCT/EP2014/001367
§ 371 (c)(1),
(2) Date: Dec. 11, 2015

(87) PCT Pub. No.: WO2014/198378
PCT Pub. Date: Dec. 18, 2014

(65) Prior Publication Data
US 2016/0144810 A1 May 26, 2016

(30) Foreign Application Priority Data

Jun. 12, 2013 (DE) .......................... 10 2013 009 801

(51) Int. Cl.
*B60R 16/03* (2006.01)
*H02J 1/10* (2006.01)
*H02J 7/14* (2006.01)

(52) U.S. Cl.
CPC .............. *B60R 16/03* (2013.01); *H02J 1/108* (2013.01); *H02J 7/1423* (2013.01)

(58) Field of Classification Search
CPC ..... B60R 25/24; B60R 16/03; B60R 16/0315; B60R 21/017; B60R 25/04;
(Continued)

(56) References Cited

U.S. PATENT DOCUMENTS 6,320,274 B1 * 11/2001 Goetze ..................... H02J 1/08
307/29
7,095,137 B2 8/2006 Rainer et al.
(Continued)

FOREIGN PATENT DOCUMENTS

DE 10160266 A1 6/2003
DE 10231089 A1 1/2004
(Continued)

OTHER PUBLICATIONS

International Search Report of corresponding international application No. PCT/EP2014/001367, dated Jul. 16, 2014 (13 pages).
(Continued)

*Primary Examiner* — Zeev V Kitov
*Assistant Examiner* — Brian K Baxter
(74) *Attorney, Agent, or Firm* — Alston & Bird LLP

(57) ABSTRACT

Motor vehicle is provided with a first onboard power supply with a first voltage source which provides a first onboard power supply voltage and with a second onboard power supply with a second voltage source which provides a second onboard power supply voltage different from the first onboard power supply voltage, wherein the two onboard power supply voltages are direct-current voltages, wherein at least one power supply isolating device connects a connection point of the first onboard power supply and a connection point of the second onboard power supply, wherein the power supply isolating device includes at least one semiconductor device, wherein the power supply isolating device has a reverse direction and a forward direction, and wherein the forward direction of the power supply isolating device is directed from the first onboard power supply into the second onboard power supply.

9 Claims, 2 Drawing Sheets

Figure 1:
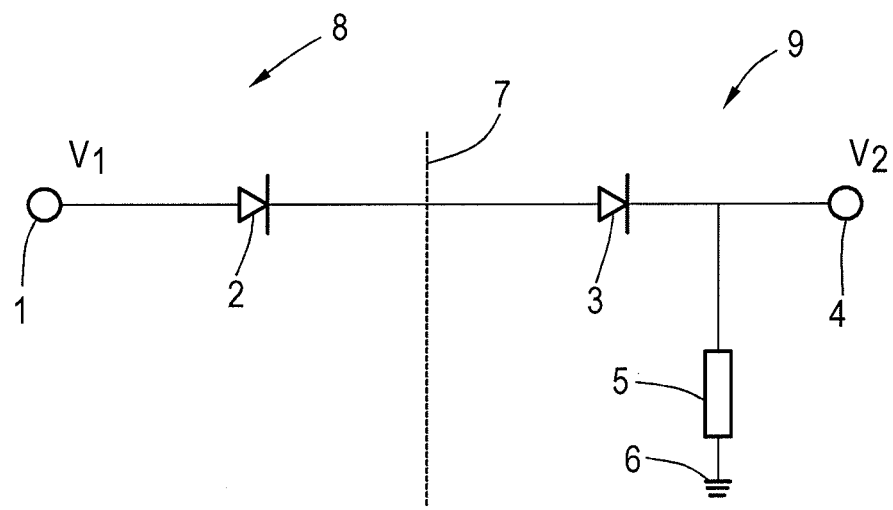

(58) Field of Classification Search
CPC ....... G07C 2009/00793; G07C 9/00309; H02J 2001/008; H02J 7/1423; H02J 7/1446; H02J 7/345; H02J 1/108; H02J 5/005; H02J 9/005; H02J 7/025; H02J 17/00; H02J 7/1438; Y10T 307/383; Y10T 307/391; Y10T 307/675; F02N 11/04; F02N 11/0866; F02N 2011/0885; F02N 2011/0888; H02P 9/307; H02P 2101/45; Y02T 10/70; Y02T 10/7005; Y02T 10/7077; H01F 38/14; B60L 11/182; B60L 11/14; B60L 11/18
USPC .............................. 307/9.1, 10.1, 10.2, 104
See application file for complete search history.

(56) References Cited

U.S. PATENT DOCUMENTS

| | | | |
|---|---|---|---|
| 7,888,962 B1* | 2/2011 | Om ................. | H03K 19/01742 326/30 |
| 7,982,333 B2 | 7/2011 | Gert et al. | |
| 8,026,630 B2 | 9/2011 | Broesse et al. | |
| 8,076,794 B2 | 12/2011 | Hartmut et al. | |
| 8,324,754 B2 | 12/2012 | Broesse et al. | |
| 9,065,351 B2 | 6/2015 | Wenger et al. | |
| 2003/0127912 A1* | 7/2003 | Mackel ................ | H02J 1/08 307/10.1 |
| 2004/0100150 A1* | 5/2004 | Bolz ................ | H03K 17/08142 307/116 |
| 2004/0112320 A1 | 6/2004 | Bolz et al. | |
| 2004/0164705 A1* | 8/2004 | Taniguchi ............ | H02J 7/1423 320/104 |
| 2006/0071557 A1* | 4/2006 | Osawa ................. | B60L 3/0046 307/10.1 |
| 2007/0007930 A1* | 1/2007 | Bolz ...................... | F02D 41/20 323/205 |
| 2008/0151454 A1* | 6/2008 | Uhl ........................ | B60R 21/01 361/87 |
| 2009/0273236 A1* | 11/2009 | Broesse ................ | H02J 7/1423 307/9.1 |
| 2011/0012424 A1 | 1/2011 | Wortberg et al. | |
| 2012/0041621 A1* | 2/2012 | Marus .................... | B60L 1/003 701/22 |
| 2012/0112702 A1* | 5/2012 | Steigerwald .......... | B60L 3/0069 320/137 |
| 2012/0158245 A1* | 6/2012 | Yoshizawa .............. | B60R 16/03 701/36 |
| 2013/0106320 A1* | 5/2013 | Yugo ......................... | H02P 7/00 318/139 |
| 2013/0234675 A1* | 9/2013 | King ....................... | H02J 7/022 320/163 |
| 2013/0245869 A1* | 9/2013 | Nishida ................. | B60L 3/0069 701/22 |
| 2013/0264869 A1 | 10/2013 | Klinkig et al. | |
| 2014/0111121 A1* | 4/2014 | Wu ........................ | B60L 11/005 318/139 |
| 2014/0117925 A1 | 5/2014 | Pischke et al. | |
| 2014/0320207 A1* | 10/2014 | Huang ................. | H03G 1/0023 330/254 |
| 2015/0061567 A1* | 3/2015 | Gorka ................. | B60L 11/1803 318/724 |

FOREIGN PATENT DOCUMENTS

| | | |
|---|---|---|
| DE | 102004041511 A1 | 3/2006 |
| DE | 102005056232 A1 | 5/2007 |
| DE | 102006036424 A1 | 2/2008 |
| DE | 102006036425 A1 | 2/2008 |
| DE | 102007062955 A1 | 7/2009 |
| DE | 102008041341 A1 | 2/2010 |
| DE | 102008054706 A1 | 6/2010 |
| DE | 102008054885 A1 | 6/2010 |
| DE | 102010054191 A1 | 6/2012 |
| DE | 102012007225 A1 | 11/2012 |
| DE | 102012208520 A1 | 12/2012 |

OTHER PUBLICATIONS

International Preliminary Report on Patentability and Written Opinion of corresponding International Application No. PCT/EP2014/001367, dated May 21, 2015 (13 pages).

Search report from corresponding German Application No. 102013009801.7, dated Jul. 29, 2014 (6 pages).

Office Action for Chinese Application No. 201480022455.1 dated Jan. 4, 2017.

Decision to Grant Patent for European Application No. 14725965.9 dated Dec. 15, 2016 (no translation available).

* cited by examiner

MOTOR VEHICLE HAVING TWO VEHICLE ELECTRICAL SYSTEMS WITH DIFFERENT VEHICLE-ELECTRICAL-SYSTEM VOLTAGES

CROSS REFERENCE TO RELATED APPLICATIONS

This application is a national stage 371 application of International Application No. PCT/EP2014/001367 filed May 21, 2014, which priority to and the benefit of German Application No. 102013009801.7, filed June 12, 2013, the entire contents of which are hereby incorporated by reference.

The invention relates to a motor vehicle with a first onboard power supply with a first voltage source which provides a first onboard power supply voltage and with a second onboard power supply with a second voltage source which provides a second onboard power supply voltage different from the first onboard power supply voltage, wherein the two onboard power supply voltages are direct-current voltages, wherein at least one power supply isolating device connects a connection point of the first onboard power supply and a connection point of the second onboard power supply.

A large part of the current motor vehicle fleet only has a single 12-V onboard power supply. In particular, given the increasing importance of electrical drives or hybrid drives for motor vehicles, it is desirable to use higher voltages in onboard power supplies. In addition, it is often the case that portions of the onboard electronics of the motor vehicle should continue to be operated in a power supply with 12-V onboard voltage. It is therefore advantageous to provide two onboard power supplies with different onboard power supply voltages in a motor vehicle.

If two different onboard power supplies are used in a motor vehicle, it is often necessary to convey information from one onboard power supply to the other onboard power supply. For example, a communication bus such as a CAN bus, for example, can be part of a power supply with a relatively low onboard power supply voltage. Nonetheless, it can be appropriate, for example, to control a motor control unit that is part of an onboard power supply with a second higher onboard power supply voltage via this bus. In this case, information has to be conveyed from an onboard power supply with a lower onboard power supply voltage into an onboard power supply with a higher onboard power supply voltage. On the other hand, under some circumstances, measured values, defect signals or the like are provided by the components in the onboard power supply with higher onboard power supply voltage, which should then be fed again into the communication bus. In this case, a communication from the onboard power supply with the higher onboard power supply voltage to the onboard power supply with the lower onboard power supply is necessary.

For information exchange between two onboard power supplies with different onboard voltages, it is essential to prevent a short circuit between the two onboard power supplies. In the case of a short circuit of an onboard power supply with a lower onboard power supply voltage, that is to say 12 V, for example, and an onboard power supply with a higher onboard power supply voltage, for example, 48 V, this could lead to the higher onboard power supply voltage being applied to components designed for operation with a lower onboard power supply voltage, which can lead to defective functions and possibly even permanent damage to the components.

Typically, isolating couplers are therefore used for the information exchange, which allow a current-free information transmission between the power supplies. An isolating coupler can be, for example, an opto-coupler, in which, due to a voltage signal of the onboard power supply from which information is to be transmitted, a light source, for example, a light emitting diode, is operated, whose light influences the conductivity of a phototransistor or similar component in the onboard power supply into which the information is to be transmitted. As a result, a complete electrical decoupling of the two onboard power supplies occurs.

In addition, isolating couplers are also used that provide an electromagnetic coupling instead of an optical coupling of the two onboard power supplies, for example, isolating couplers comprising a miniaturized transformer or isolating couplers that comprise a coil on the signal generating side and a structure with giant magnetoresistance on the signal receiving side. The disadvantage of these solutions is that isolating couplers are relatively large and relatively expensive components.

Therefore, the invention is based on the problem of providing a motor vehicle which allows information transmission between two onboard power supplies in a manner that reliably prevents a short circuit between these onboard power supplies.

In a motor vehicle of the type mentioned at the start, for the solution of this problem, it is provided according to the invention that the power supply isolating device comprises at least one semiconductor device, wherein the power supply isolating device has a reverse direction in which substantially no current transport occurs below a breakdown voltage, and a forward direction in which current transport occurs above a minimum voltage, wherein the forward direction of the power supply isolating device is directed from the first onboard power supply into the second onboard power supply, whereby, by controlling a voltage at the connection point of the first onboard power supply, a first signal can be transmitted from the first onboard power supply into the second onboard power supply and/or whereby, by controlling a controllable impedance between the connection point of the second onboard power supply and a reference potential which constitutes a common reference potential for the two onboard power supplies, a second signal can be transmitted from the second onboard power supply into the first onboard power supply.

The invention is therefore based on the idea that, in the transmission of information between the onboard power supplies of a motor vehicle, it is indeed necessary to prevent short-circuiting the power supplies, and, in particular, to prevent a higher onboard power supply voltage from "breaking through" into the onboard power supply with the lower onboard power supply voltage; however, a complete galvanic isolation of the two onboard power supplies is not necessary. Typically, in a motor vehicle, for the two onboard power supplies, a common reference or ground potential connected to the car body, for example, is used in any case. The connection of the two onboard power supplies to this ground potential occurs in fact usually at different points, but, nevertheless, a current-conducting coupling of the onboard power supplies is provided via this common ground potential, as a result of which the two onboard power supplies are galvanically coupled.

Since the onboard power supplies are in any case already galvanically coupled, there is no need to ensure a complete galvanic isolation during the signal transmission. The only crucial factor is to prevent a short circuit between the power supplies and thus an application of the high voltage to the onboard power supply which is designed for operation with the lower voltage.

In this context, it is not disadvantageous if current flows from the first onboard power supply into the second onboard power supply, as long as current transport from the second onboard power supply into the first onboard power supply is prevented. Such a directed current transport can be achieved by semiconductor devices, particularly diodes, but also by appropriately connected field effect transistors or similar devices. Such semiconductor devices have a reverse direction in which current flows only starting at a certain relatively high voltage. If the semiconductor device is selected so that the breakdown voltage, that is to say the voltage starting at which current flow in the reverse direction is possible, is higher than the difference between the onboard power supply voltage in the first and in the second onboard power supply, and then, as a result, current flow in the reverse direction is prevented nearly completely. Only a very slight leakage current flows, which can be less than 1 µA, for example. The leakage currents flowing in the reverse direction of the semiconductor devices are an inherent property of semiconductor devices. It is advantageous to select semiconductor devices with the smallest possible leakage currents, but complete prevention of leakage currents is not possible. These slight leakage currents lead nevertheless only to insignificant potential changes in the first onboard power supply, which are negligible.

The semiconductor device has only a very low resistance in the forward direction. Thus, a current transport from the first into the second onboard power supply is easily possible.

Two cases must be distinguished for the signal transport between the current power supplies. If the voltage at the connection point of the second onboard power supply is higher than the voltage at the connection point of the first onboard power supply, then no current transport through the power supply isolating device occurs. As a result, the two connection points are decoupled and the potential at the connection point of the first onboard power supply and the potential at the connection point of the second onboard power supply are independent of one another. However, if the voltage at the connection point of the first onboard power supply is higher than the voltage at the connection point of the second onboard power supply, then current transport in the forward direction of the power supply isolating device occurs, as a result of which the connection point of the first onboard power supply and the connection point of the second onboard power supply are connected in a an electrically conductive manner to one another and have therefore nearly the same potential.

This property of the power supply isolating device can be used for signal transport from the first onboard power supply into the second onboard power supply and for signal transport from the second onboard power supply into the first onboard power supply. The signal transport from the first into the second onboard power supply can occur as a result of adaptation of a voltage at the application point of the first onboard power supply. This can occur, for example, by a switching of the connection point between two voltages, by a digital/analog converter, by the coupling of the connection point to the first voltage source via a switchable resistor power supply, by a connection of the first connection point to the first voltage source or to the reference potential by a transistor or the like. As long as the voltage at the connection point of the first onboard power supply is higher than the voltage at the connection point of the second onboard power supply, a voltage signal can be transmitted into the second onboard power supply. Therefore, it is particularly advantageous to connect the connection point of the first onboard power supply directly or indirectly to the reference potential. For example, between the connection point of the second onboard power supply and the reference potential, a resistor can be connected, and the signal can be determined in the second onboard power supply by measuring the voltage drop at this resistor. However, it is also possible to use the voltage at the connection point of the second onboard power supply directly for control tasks, that is to say, for example, in order to control the potential at the gate of a transistor, to switch a relay, to use the voltage as input voltage of an analog/digital converter, or the like.

In the same way, a signal transport from the second onboard power supply into the first onboard power supply is possible. This signal transport occurs by controlling a controllable impedance between the connection point of the second onboard power supply and the reference potential. If now, for example, the connection point of the first onboard power supply is connected via a predetermined resistance to the first voltage source, then the voltage at the connection point of the first onboard power supply can be varied by controlling the controllable impedance in the second onboard power supply. For example, this voltage can be acquired and processed further via an analog/digital converter; however, it is also possible to use this voltage directly for control tasks, such as, for example, the control of a switch, or as gate voltage of a transistor. In particular, the controllable impedance can also be a switch which, in the open state, has a nearly infinitely high resistance, and, in the closed state, has a resistance of nearly zero. In this case, the transmission of digital signals or, for example, also of pulse width modulated signals is possible. However, it is also possible to adapt the impedance in several stages by a controllable resistor power supply, for example, or to achieve a continuous control of the impedance via a transistor, for example.

It is essential, in the motor vehicle according to the invention, although the signals are transmitted in both directions by a current flow, that a protection of the components of the onboard power supplies against the effects of a short circuit of the onboard power supplies is achieved. In particular, the goal is to prevent the higher of the two onboard power supply voltages from being applied to the components that are designed for operation at the lower onboard power supply voltage.

The signal transmission between the onboard power supplies can be used for a plurality of functions in the motor vehicle according to the invention. As mentioned at the start, for example, a communication bus, in particular a CAN bus, can be operated completely in one of the two onboard power supplies and, by coupling the two onboard power supplies with one or more power supply isolating devices it is nevertheless possible to transmit information from this bus into the other onboard power supply, or to read information, for example, measured values or defect information, from the other power supply. In particular, at the time of the coupling to a communication bus, a digital or a pulse width modulated transmission of the signals between the two onboard power supplies is advantageous, because information is to be transmitted serially or digitally in any case. However, it can also be advantageous to transmit analog signals, which correspond to any desired measured values or control values, between the onboard power supplies. Thus, it can be advantageous to carry out a control or a digital/analog or analog/digital conversion in another onboard power supply than the power supply in which the component to be monitored or to be controlled is arranged.

It is advantageous if the power supply isolating device comprises at least two series-connected semiconductor devices. They can be, in particular, semiconductor devices having the same reverse direction. The use of two series-connected semiconductor devices has the advantage that, in the case of a short circuit of one of the semiconductor devices, the full functionality of the power supply isolating device remains ensured, that is to say in that case as well a short circuit between the onboard power supplies is prevented. A short circuit of an individual semiconductor component cannot be ruled out in all cases. For example, a semiconductor device can be destroyed by brief voltage surges or other influences or alterations. It is also possible for the connections of a semiconductor device to be short circuited by soiling. The use of two series-connected semiconductor devices is thus used for the redundancy of the power supply isolating device. In order to achieve such redundancy particularly reliably, it is advantageous, in addition, if the two semiconductor devices are arranged at a separation distance, so that, in the case of mechanical damage or mechanical short circuit of one of the semiconductor devices, damage to or short circuiting of the second semiconductor device is unlikely.

As explained, it is necessary to protect the components of the onboard power supply with a lower onboard power supply voltage against the higher onboard power supply voltage. In order to achieve this, it is possible that the value of the second onboard power supply voltage is higher than the value of the first onboard power supply voltage, as a result of which no current transport occurs from the onboard power supply with higher onboard power supply voltage into the onboard power supply with lower onboard power supply voltage, so that the components in the onboard power supply with lower onboard power supply voltage are protected.

A voltage of 48 V is an advantageous operating voltage for an onboard power supply of a motor vehicle. Many of the currently used vehicle components are designed for use in an onboard power supply with 12 V. Therefore, it is advantageous if the first onboard power supply voltage is 12 V and the second onboard power supply voltage is 48 V.

In modern motor vehicles, a multitude of digital control and regulation tasks occur. Accordingly, it is often sufficient to use, as information exchanged between the onboard power supplies, a voltage state that is switched on or switched off. With such signals it is possible, for example, to transmit simple information such as defect information by switching a voltage. For the transmission of more complex digital information, a cycled transmission can occur, for example, or the data can be coded by pulse width modulated modulation, for example.

In this case, a transmission of information from the first onboard power supply to the second onboard power supply is possible, if a first switch element is arranged between the first voltage source and the connection point of the first onboard power supply, and a first control device is arranged in the first onboard power supply, for the opening and the closing of the first switch element for controlling the voltage at the connection point of the second onboard power supply. In this case, it is particularly advantageous to connect the connection point of the second onboard power supply via resistor to the reference potential. In this case, the first switch element is closed, so that, except for the case of a voltage drop at the power supply isolating device, the voltage at the connection point of the second onboard power supply is substantially equal to the voltage applied at the first switch element. However, if the switch element is open, then the voltage at the connection point of the second onboard power supply is equal to the voltage of the reference potential.

As switch element, a plurality of elements can be used, for example, relays, switches designed as ICs, transistors that are switched by two gate voltages. The control of the switch elements can occur directly by a digital output of a control device. It is also possible to use a serial communication bus of the motor vehicle directly for controlling the switch element, as a result of which the bus information can be transmitted into the second onboard power supply. In addition, any information present in the motor vehicle as one of two switch states can be transmitted, for example, pulse width modulated signals, for controlling motors, defect signals, control signals for lighting elements.

For the transmission of digitally represented information from the second to the first onboard power supply, a switch element can also be used. It is possible that a second switch element is arranged between the connection point of the second onboard power supply and the reference potential, and that a second control device arranged in the second onboard power supply is designed for the opening and the closing the second switch element for controlling the voltage at the connection point of the first onboard power supply. The designs for the switch element in the first onboard power supply also apply to the switch element in the second onboard power supply. The essential difference is that a closing of the switch element leads to a lowering of the voltage at the connection point of the first onboard power supply. If a digital signal, that is to say a signal with a high signal level and a low signal level, is transmitted, then the transmission of the signal in this case leads to an inversion of the signal, and therefore it can be advantageous to invert the digital signal before the control of the switch element or at the connection point of the first onboard power supply. However, such inversion is possible in a particularly simple way if, at the connection of the first onboard power supply, a digital input line of a control device is controlled in any case, since the inversion can then occur in software or, for example, if at the connection point of the first onboard power supply, a Schmitt trigger is connected which, in this case, can be designed as an inverting Schmitt trigger.

The first signal and/or the second signal can be a pulse width modulated voltage signal or a digital signal. A digital signal is a signal described by two switching states. These switching states can be, for example, TTL levels, that is voltages of 0 V and 5 V; however, any other voltages desired can also be selected. In the transmission of a digital signal, it can be advantageous to use a Schmitt trigger at the connection point at which the signal is transmitted, in order to achieve a better switching behavior. Pulse width modulated signals are also transmitted by two switching states, wherein, in the case of a pulse width modulated signal for signal transmission, the pulse width of a transmitted pulse wave is used with the two switching states. An advantage of the transmission of data by pulse width modulation is that the pulse wave provides a clocking signal for serial transmission of data, and as a result no separate timing of the data transmission is necessary. A pulse width modulated signal can also be used directly for controlling motors. From pulse width modulated signals, analog control voltages can also be obtained, by feeding the pulse width modulated voltage to a low-pass filter and by using the output of the low pass filter as control voltage.

The semiconductor device can be a diode. The diode is the simplest device by means of which an asymmetric current transmission can be achieved by blocking in one direction and passage in the other direction. Diodes are available in a plurality of designs, whereby very high breakdown voltages with very small leakage currents are possible. For example, the leakage current of the semiconductor element in the reverse direction is less than 1 µA in the case of a voltage of 70 V.

In some application cases, for example, when relatively low voltages are to be transmitted between the onboard power supplies, it can be advantageous to use other semiconductor devices which then however are wired in a manner so that they act effectively as diodes. For example, instead of a diode, a correspondingly wired field effect transistor can be used. This is advantageous, since the voltage decay on a field effect transistor with correspondingly wired gate in the forward direction is considerably less than the voltage that decreases at a diode. In the same way, a plurality of other transistors can be interconnected so that they exhibit diode behavior, for example, MOS-FETs, IGBTs, or the like. It is essential that the semiconductor device comprises a reverse direction and a forward direction, which, in the case of semiconductor devices, can be achieved in particular by the presence of a boundary layer between a P semiconductor and an N semiconductor or by applying a voltage, in particular to a gate electrode.

Additional advantages and details of the invention result from the embodiment examples described below and the drawings.

Figure 2:
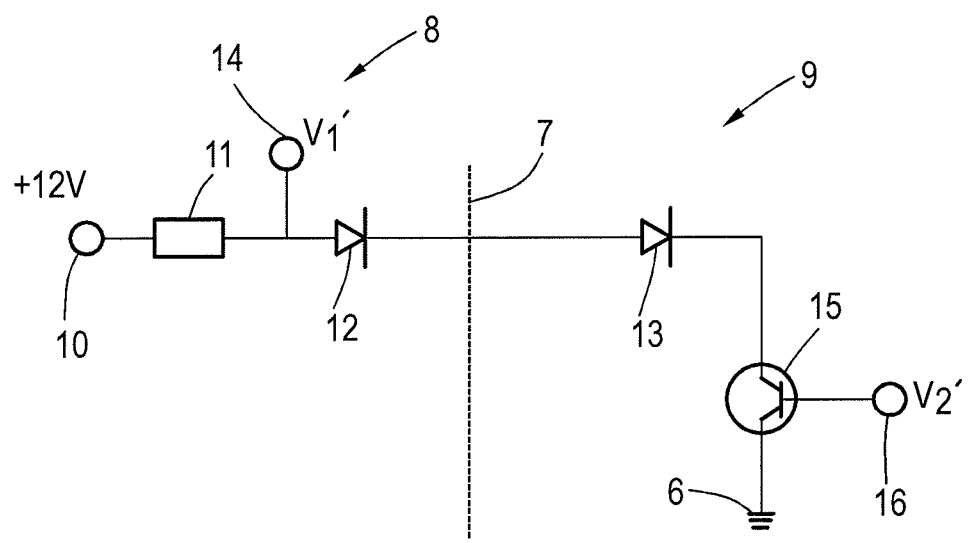
Figure 3:
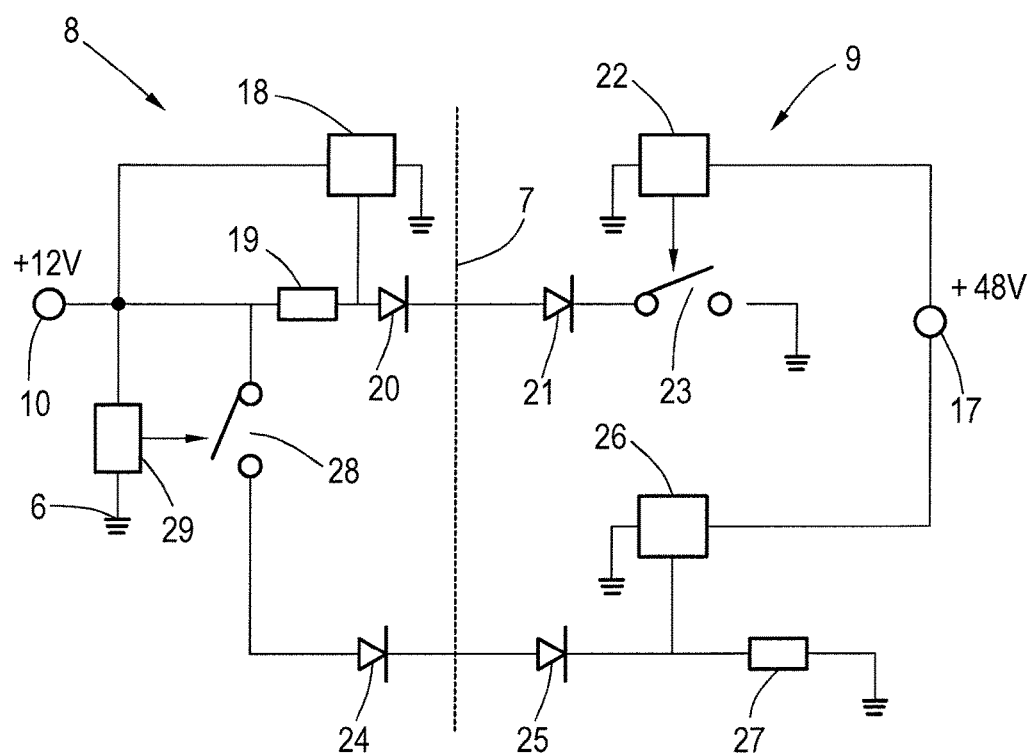

FIG. 1 shows a detail of the onboard power supply of an embodiment example of a motor vehicle according to the invention, FIG. 2 shows another detail of the onboard power supply of the motor vehicle, and FIG. 3 shows a third detail of the onboard power supply of the motor vehicle.

FIG. 1-FIG. 3 in each case show detail views of the onboard power supplies of a motor vehicle. In FIG. 1-FIG. 3, in each case only components are shown that are necessary to understand the signal transmission from the first onboard power supply into the second onboard power supply and vice versa.

For example, FIG. 1 shows the transmission of information from the first onboard power supply 8 into the second onboard power supply 9. The second onboard power supply 9 has a higher onboard power supply voltage, namely 48 V, than the first onboard power supply 8 which has an onboard power supply voltage of 12 V. The two onboard power supplies have a common reference potential, wherein the connection to the common reference potential 6, formed by the car body, for example, occurs at a spatial separation distance from the first onboard power supply 8 and the second onboard power supply 9. The isolation of the first onboard power supply 8 and of the second onboard power supply 9 is represented symbolically by the line 7. The difference between the onboard power supplies 8, 9 is that, at the components in the second onboard power supply 9, voltages of up to 48 V are expected, and at the components in the first onboard power supply 8, voltages of up to 12 V are expected. Therefore, for reliable operation of the motor vehicle, it is essential to prevent a strong current flow from the second onboard power supply 9 into the first onboard power supply 8. Usually, in motor vehicles, the negative pole of an energy storage device, which is not shown, is to be connected to the reference potential 6. Therefore, in the two onboard power supplies 8, 9, positive voltages are expected exclusively. This means that the diodes 2, 3, which together form the power supply isolating device, then allow current flow exclusively if the voltage at the connection point 1 of the first onboard power supply 8, that is to say the voltage V1, is higher than the voltage at the connection point 4 of the second onboard power supply 9, that is to say the voltage V2.

Since the connection point 1 is located in the first onboard power supply 8 is located in, a maximum voltage of 12 V is to be expected at the connection point 1. Thus, a current flow through the power supply isolating device, that is to say the semiconductor devices 2, 3 which are designed as diodes, occurs only when the voltage at the connection point 4 in the second onboard power supply 9 is lower than 12 V. Thus it is ensured, due to the power supply isolating device, that the power supplies are not short circuited in such a manner that voltages of more than 12 V can reach the first onboard power supply 8.

The power supply isolating device here consists of two semiconductor devices 2, 3, since, in this case, the short circuiting of one of the semiconductor devices 2 or 3, for example, due to mechanical or electrical damage to or contamination of the printed circuit board leading to a short circuit of the semiconductor device, does not lead to a short circuiting of the onboard power supplies 8, 9. If the semiconductor device 2 is short circuited, essentially nothing changes in the voltage distribution in FIG. 1, since already no voltages of more than 12 V are possible on the left side of the semiconductor device 3. However, if in FIG. 1, the semiconductor device 3 is short circuited, then potentially higher voltages up to 48 V can reach the semiconductor device 2. This corresponds to an extension of the second onboard power supply 9 such that the semiconductor device 2 is now part of the second onboard power supply 9, that is to say is a component, at which voltages of up to 48 V are to be expected. Nevertheless, the high voltage of the second onboard power supply 9 cannot reach the other components of the first onboard power supply 9, since the semiconductor device 2, in case of the application of a voltage that is higher than the voltage at the connection point 1 of the first onboard power supply, that is also at any voltage higher than 12 V, prevents a current flow and thus isolates the power supply.

With the part of the circuit shown, the signals applied in the first onboard power supply 8 at the connection point 1 are transmitted into the second onboard power supply 9 at connection point 4. The supplying of the signal to be transmitted at connection point 1 and the further use of the signal applied at the connection point 4 are not shown here. A voltage at the connection point 1 can be generated, for example, by a digital/analog converter; however it is also possible to set the voltage V1 at the connection point 1, for example, by connecting the connection point 1 to the voltage supply, which is not shown, that is to say a voltage of 12 V, via an adjustable resistor, transistor or the like.

The further processing of the voltage V2 applied at the connection point 4 to the extent possible should occur here by means of a component with high input resistance. As a result, the resistance of the processing component can be neglected in the following discussion. Such components with high input resistance are, for example, field effect transistors, IGBTs, analog/digital converters, or the like. Since it is assumed here that the other components connected to connection point 4 have high resistances, the voltage V2 is determined exclusively by the voltage V1, the reference potential 6 as well as the voltages that decrease at the semiconductor devices 2 and 3 and at the resistor 5. Usually, at diodes, voltages in the range of several 100 mV are produced. The resistor 5 should be selected here to be strong. This has the advantage, on the one hand, that only small currents are necessary for the transmission of the signal, and, on the other hand, that the influence of other devices is thereby reduced, as a result of which a better signal transmission from the connection point 1 to the connection point 4 is possible. Ignoring the voltage drop at the semiconductor devices 2 and 3, which is usually negligible, the voltage V2 is thus equal to the voltage V1. Thus, with the circuit shown in FIG. 1, the transmission of any voltage value V1 applied to the connection point 1 from the first onboard power supply 8 to the connection point 4 of the second onboard power supply 9, where it is present as voltage V2, is possible. At the same time, the components of the first onboard power supply 8 are protected, as explained, against the higher voltages in the second onboard power supply 9.

FIG. 2 shows the signal transmission in the reversed direction, that is to say from the second onboard power supply 9 into the first onboard power supply 8. In this case, a voltage V2', which is applied at the connection point 16 of the second onboard power supply 9, influences a voltage V1' which is applied at the connection point 14 of the first onboard power supply. With regard to the generation of the voltage V2', the statements made for the voltage V1 apply, and for the further use of the voltage V1', the statement made for the voltage V2 applies. The semiconductor devices 12, 13, in terms of their function, correspond to the semiconductor devices 2, 3 and form a power supply isolating device. For the sake of simplicity, the voltage drop at the semiconductor devices 12, 13 in the forward direction is to be neglected in the further discussion. The voltage V2' is transmitted through connection point 16 to the gate of a transistor 15. In the simplest case, this transistor 15 can here be used as a switch which has a very high or very low resistance depending on the voltage V2'. It is also possible to use the transistor 15 as a variable resistor. This is particularly advantageous in a linear range of the transistor.

If the voltage drop at the semiconductor devices 12, 13 is neglected, then the transistor 15 and the resistor 11 form a voltage splitter. The voltage V1' at the connection point 14 of the first onboard power supply thus corresponds to the ratio of the resistance of transistor 15 to the sum of the resistances of the transistor 15 and of the resistor 11. Since the resistance of the transistor 15 depends on the control voltage V2' of the transistor, the voltage V1' at the first connection point 14 of the first current circuit 8 is controlled by the voltage V2' at the connection point 16 of the second current circuit. Thus, information transmission from the second circuit 9 into the first circuit 8 occurs.

FIG. 3 shows a slightly larger detail of the circuit of the onboard power supplies of the motor vehicle, wherein here a signal transmission is shown between the first onboard power supply 8 and the second onboard power supply 9 in the two directions.

The essential elements of the circuit are already known from FIG. 1 and FIG. 2. The semiconductor devices 24 and 25 as well as the resistor 27 correspond to the semiconductor devices 2 and 3 and the resistor 5 in FIG. 1. There, a direct application of a voltage V1 for the transmission of information into the second onboard power supply 9 is shown. In FIG. 3, the voltage is switched at the semiconductor device 24, and thus at a connection point of the first onboard power supply 8, by a switch 28. If the switch 28, as shown, is open, then, as long as a positive potential is still applied to one of the semiconductor devices 24, current flows via the semiconductor devices 24 and 25 and the resistor 27 to the reference potential 6, until a potential corresponding substantially to the reference potential 6 is applied at the semiconductor device 24. Thus, at the connection point of the second onboard power supply 9, which is located here between semiconductor device 25 and resistor 27, a potential is applied, which corresponds substantially to the reference potential 6. This potential controls a component 26 in the second onboard power supply 9, which can be part of a motor control.

If switch 28 is closed, then the semiconductor device 24 is connected to the first voltage source 10, as a result of which a voltage of 12 V is applied at semiconductor device 24. If the voltage drop at the semiconductor devices 24 and 25 is again neglected, then thereby a voltage of approximately 12 V decreases at resistor 27. This voltage is now applied at the connection point of the second onboard power supply 9 between semiconductor device 25 and resistor 27 and it controls component 26. Thus, by opening and closing the switch 28 in the first onboard power supply 8, a component 26 in the second onboard power supply 9 can be controlled. The control of the switch 28 occurs by a control device 29. The control device 29 is supplied with a voltage of 12 V by the first voltage source 10. The control can occur, for example, as a function of bus signals received.

In the same way, in the wiring detail shown in FIG. 3, information transmission from the second onboard power supply 9 into the first onboard power supply 8 is possible. For this purpose, the first voltage source 10 is connected via the resistor 19, the two semiconductor devices 20 and 21 and the switch 23 to the reference potential 6. The semiconductor devices 20 and 21 correspond to the semiconductor devices 12 and 13 shown in FIG. 2 and the resistor 19 corresponds to the resistor 11 shown in FIG. 2. The switch 23 here fulfills the same function as the transistor 15 shown in FIG. 2. By switching the switch 23 on, the voltage at the connection point of the first onboard power supply between resistor 19 and semiconductor device 20 can thus be switched between the reference potential, that is to say 0 V, and +12 V. The control of the switch 23 occurs by a control device 22. The latter can close the switch 23, for example, if a defect signal is present. The signal applied at the connection point of the first onboard power supply 8 can be further processed by a component 18 of the first onboard power supply 8. For example, the voltage can be brought by a voltage splitter into the range of a TLL level, subsequently supplied to a Schmitt trigger and then to a digital input in order to be fed into a bus.

As can be seen in the embodiment examples shown, a simple and advantageous transmission of signals from a first onboard power supply into a second onboard power supply and vice versa is possible, wherein, however, the components of a low-voltage onboard power supply can be protected against the consequences of short circuiting of the onboard power supplies. By using semiconductor devices such as diodes, such an isolation of the power supplies is possible in a very simple and cost effective manner. By using two separated semiconductor devices one achieves moreover that a defect of a single component does not lead to a short circuit between the power supplies. Depending on the concrete requirements, different semiconductor components can be used. Thus, for the transmission of low voltages, field effect transistors can be used, in order to minimize the voltage drop at the semiconductor devices. It is also possible to achieve particularly high breakdown voltages, for example, by using high-voltage diodes, as a result of which a protection of the first onboard power supply is also possible if, for example, voltage variations with high amplitude possibly occur at the connection point of the second onboard power supply. By an appropriate selection of the semiconductor device, very small leakage currents can also be achieved, for example, of clearly less than 1 μA in the case of a voltage of 70 V.

The invention claimed is:

1. Motor vehicle with a first onboard power supply with a first voltage source which provides a first onboard power supply voltage and with a second onboard power supply with a second voltage source which provides a second onboard power supply voltage different from the first onboard power supply voltage, wherein the first onboard power supply voltage and the second onboard power supply voltage are direct-current voltages, wherein at least one power supply isolating device connects a connection point of the first onboard power supply and a connection point of the second onboard power supply, wherein the power supply isolating device comprises at least one semiconductor device, wherein the power supply isolating device has a reverse direction in which substantially no current transport occurs below a breakdown voltage, and a forward direction in which current transport occurs above a minimum voltage, wherein the forward direction of the power supply isolating device is directed from the first onboard power supply into the second onboard power supply, wherein the first onboard power supply and the second onboard power supply are designed in order to transmit a first communication signal from the first onboard power supply with the first onboard power supply voltage into the second onboard power supply with the second onboard power supply voltage, wherein the value of the second onboard power supply voltage is higher than the value of the first onboard power supply voltage, and wherein the first onboard power supply and the second onboard power supply are designed to transmit the first communication signal by controlling a voltage at the connection point of the first onboard power supply and in order to transmit a second communication signal from the second onboard power supply with the second onboard power supply voltage into the first onboard power supply with the first onboard power supply voltage by controlling a controllable impedance between the connection point of the second onboard power supply and a reference potential which constitutes a common reference potential for the first onboard power supply and the second onboard power supply.

2. Motor vehicle according to claim 1, characterized in that
the power supply isolating device comprises at least two series-connected semiconductor devices.

3. Motor vehicle according to claim 2, characterized in that
the connections of at least two series-connected semiconductor devices of a power supply isolating device have a separation distance of at least 1 mm.

4. Motor vehicle according to claim 3, characterized in that
the first onboard power supply voltage is 12 V and the second onboard power supply voltage is 48 V.

5. Motor vehicle according to claim 1, characterized in that
a first switch element is arranged between the first voltage source and the connection point of the first onboard power supply, and a first control device arranged in the first onboard power supply is designed for the opening and the closing of the first switch element for controlling the voltage at the connection point of the second onboard power supply.

6. Motor vehicle according to claim 1, characterized in that
a second switch element is arranged between the connection point of the second onboard power supply and the reference potential, and a second control device arranged in the second onboard power supply is designed for the opening and the closing of the second switch element for controlling the voltage at the connection point of the first onboard power supply.

7. Motor vehicle according to claim 5, characterized in that
the first communication signal and/or the second communication signal is a pulse width modulated voltage signal or a digital signal.

8. Motor vehicle according to claim 1, characterized in that
the at least one semiconductor device is a diode.

9. Motor vehicle according to claim 1, characterized in that
the leakage current of the at least one semiconductor device in the reverse direction is less than 1 μA in the case of a voltage of 70 V.

* * * * *